United States Patent [19]

Bass et al.

[11] Patent Number: 5,796,964

[45] Date of Patent: Aug. 18, 1998

[54] METHOD FOR MODIFYING AN EXISTING COMPUTER BUS TO ENHANCE SYSTEM PERFORMANCE

[75] Inventors: Brian Mitchell Bass, Apex; Douglas Ray Henderson; Karen Park Heron, both of Raleigh; Jeffrey Wayne Kidd; Edward Hau-chun Ku, both of Cary; Charles Steven Lingafelt, Sr., Durham; Loren Blair Reiss, Raleigh, all of N.C.

[73] Assignee: International Business Machines, Armonk, N.Y.

[21] Appl. No.: 586,409

[22] Filed: Jan. 16, 1996

[51] Int. Cl.[6] ............................................. G06F 13/14
[52] U.S. Cl. ................................... 395/308; 395/306
[58] Field of Search ............................... 395/306, 308, 395/309, 293, 290

[56] References Cited

U.S. PATENT DOCUMENTS

| | | |
|---|---|---|
| 4,837,682 | 6/1989 | Culler. |
| 4,933,838 | 6/1990 | Elrod. |
| 5,237,670 | 8/1993 | Wakerly. |
| 5,261,057 | 11/1993 | Coyle et al. ......................... 395/308 |
| 5,276,893 | 1/1994 | Savaria. |
| 5,337,411 | 8/1994 | Harrison, Jr.. |
| 5,341,488 | 8/1994 | Kobayashi. |
| 5,371,896 | 12/1994 | Gove et al.. |
| 5,426,740 | 6/1995 | Bennett ................................ 395/306 |
| 5,675,736 | 10/1997 | Brady et al. ...................... 395/200.03 |

OTHER PUBLICATIONS

IBM Technical Disclosure Bulletin, vol. 32, No. 5A, Oct. 1989, "Freeway –A Computer Circuit Module to Increase Data Transfer Data".

IBM Technical Disclosure Bulletin, vol. 34, No. 48, Sep. 1991, "CPU Bus Bandwidth Pacing in a Dual–Bus System".

Primary Examiner—Glenn A. Auve
Attorney, Agent, or Firm—Felsman, Bradley, Gunter & Dillon; Stephen T. Keohane; John J. Timar

[57] ABSTRACT

A method for improving the performance of an existing busoriented computer system with minimum or no design change to the existing hardware, bus protocol, or bus operation is disclosed. Specifically, the present invention improves the effective bandwidth of an existing bus architecture by creating multiple physical instantiations of the existing bus and directing traffic onto these different buses based on the type of bus operation being performed. This results in multiple components having the capability to simultaneously perform bus operations, therefore improving the effective bandwidth of the system. This invention also allows the components which are current being utilized in the existing bus architecture to be re-utilized with minimum additional external logic.

8 Claims, 6 Drawing Sheets

METHOD FOR MODIFYING AN EXISTING COMPUTER BUS TO ENHANCE SYSTEM PERFORMANCE

BACKGROUND OF THE INVENTION

1. Technical Field

The present invention relates to a method for enhancing data processing system performance in general, and in particular to a method for directing control flow and data flow within a computer system. Still more particularly, the present invention relates to a method for segmenting and distributing control flow and data flow of an existing bus within a computer system in order to improve system performance.

2. Description of the Prior Art

In most computer systems, the function of communications among different components is typically provided by a bus architecture. Hence it is desirable for this bus architecture to be well established and portable such that it can be utilized in multiple configurations without exorbitant additional development expenses when designing for derivative products.

Figure 1:
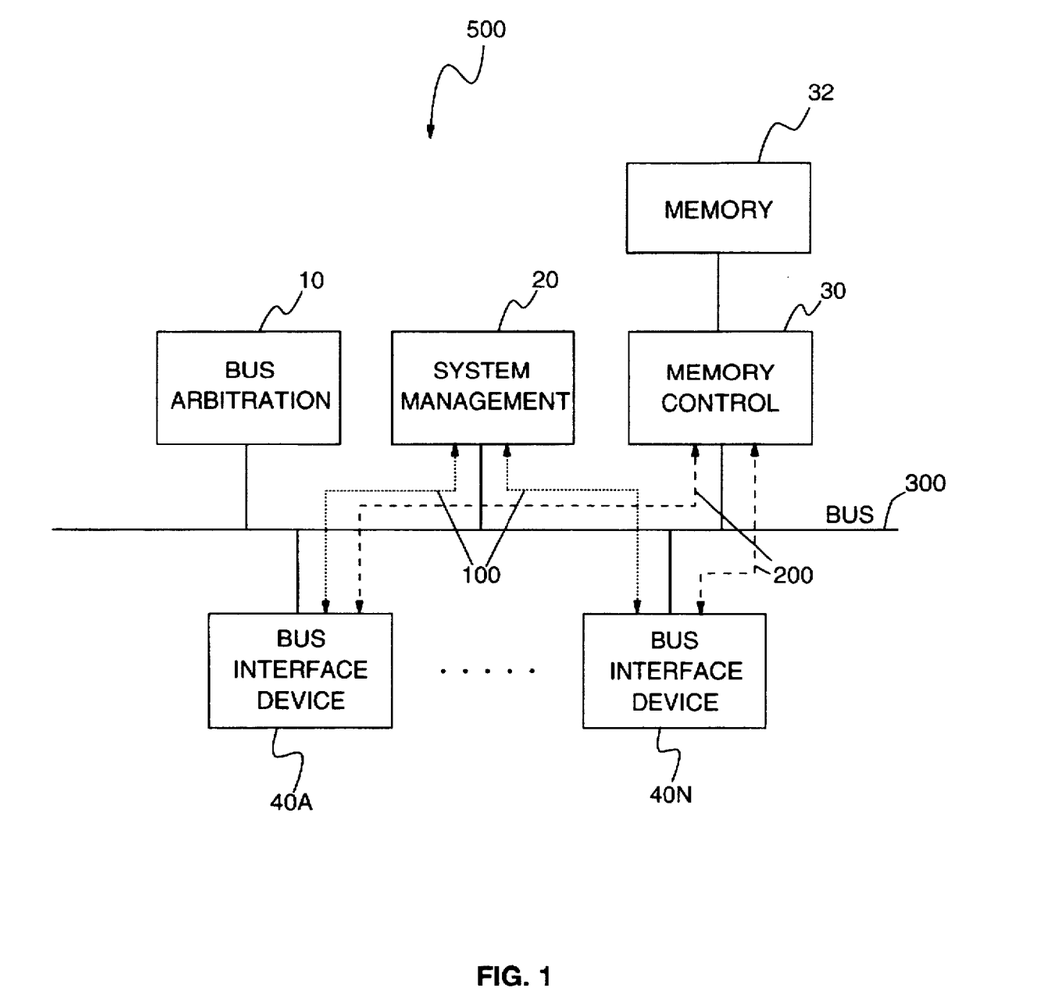
FIG. 1 is a block diagram of a typical bus architecture within a computer system under prior art.

Referring now to the drawings and in particular to FIG. 1, there is illustrated a block diagram of a typical bus architecture within a computer system under the prior art. This bus architecture comprises different components and functions, as described below.

Bus 300 is a physical implementation of shared connections among all components within computer system 500 for the purpose of inter-communication. Bus 300 also encompasses a set of rules or protocol that regulate and define such inter-communication among all components. Bus 300 typically consists of address and data connections (not shown) as well as tags or control connections (not shown). Memory 32 is a shared storage for data being transferred into and out of computer system 500, and memory control 30 provides an interface between memory 32 and bus 300.

Bus arbitration 10 is a function that determines which one of the attached components on bus 300 should control the operations on bus 300 at a selected time. Bus arbitration 10 assigns the ownership of bus 300 for any given operation. System management 20 is a function that manages the information in memory 32 to accomplish various system functions. System management 20 also provides higher-level functions associated with system operations such as queue management and bus monitoring for error situations. System management 20 may exist as a software in a microprocessor (not shown) or as a hardware implementation attaching to bus 300.

Bus interface devices 40a, 40n, which represent any other components that are directly attached to bus 300, can generate or receive data and control transfers across bus 300. Any one of bus interface devices 40a, 40n that has the capability to initiate or control the actual operation taking place on bus 300 is referred to as a bus master. The concept of a bus master implies that bus arbitration 10 has granted temporary ownership of bus 300 to a particular bus interface device such that the particular bus interface device can initiate and perform a desired bus operation. Contrarily, any bus interface device that is currently a recipient of a bus operation initiated by the bus master is referred to as a bus slave.

The typical bus architecture of computer system 500 carries at least two types of traffic, namely, data flow 200 and control flow 100. Data flow 200 is the movement of data into and out of components, such as shared memory 32, via bus 300. Control flow 100 is the type of bus operation which controls specific actions to be taken by system management 20 or bus interface devices 40a, 40n. Control flow 100 can take the form of commands or primitives and occurs between system management 20 and bus interface devices 40a, 40n. Data flow 200 and control flow 100 across bus 300 may be distinguished by tags, addressing schemes, or a set of physical signals called command lines. These different flows may be routed across bus 300 from a source to an appropriate destination by controlling and interpreting either tags or addresses.

The typical bus architecture, as shown in FIG. 1, generally suffers performance limitations dictated primarily by the bandwidth of bus 300. If a level of service that exceeds the bandwidth of bus 300 is required, the bandwidth of bus 300 must also be increased in order to improve the overall system performance. Generally, this is done by changing the bus architecture in the form of increasing the width of bus 300, increasing the speed of bus 300, or changing the protocol of bus 300. All of these changes require significant or complete redesign of all participating components connecting to bus 300. If many hardware components have already been designed for a specific bus architecture and configuration, a drastic change in the bus architecture usually results in significant expenses and delays associated with a hardware redesign.

Consequently, it would be desirable to provide a method for increasing the performance of an existing bus-oriented computer system with no design changes to the existing hardware, bus protocol, or bus operation.

SUMMARY OF THE INVENTION

In view of the foregoing, it is therefore an object of the present invention to provide an improved method for enhancing data processing system performance.

It is another object of the present invention to provide an improved method for directing control flow and data flow within a computer system.

It is yet another object of the present invention to provide a method for segmenting and distributing control flow and data flow of a bus within a computer system in order to improve system performance.

In accordance with the method and system of the present invention, the effective bandwidth of a single bus architecture within a computer system can be improved by bus modification with minimum or no design changes to the existing hardware, bus protocol or bus operation. The single bus is first divided into two or more buses. Next, all the components that are connected to the single bus within the system are grouped into two or more groups according to the respective flow type utilized by the components in the single bus. Finally, each of these components are connected to one of the two or more buses via an external bus selector, according to each component's respective group.

All objects, features and advantages of the present invention will become apparent in the following detailed written description.

BRIEF DESCRIPTION OF THE DRAWINGS

The invention itself as well as a preferred mode of use, further objects and advantage thereof, will best be understood by reference to the following detailed description of an illustrative embodiment when read in conjunction with the accompanying drawings, wherein.

DETAILED DESCRIPTION OF PREFERRED EMBODIMENT

The present invention may be implemented in a variety of computers that utilize buses for internal data communication. Such a computer may be a stand-alone system or part of a network, such as a local area network (LAN) or a wide area network (WAN).

As a preferred embodiment of the invention, any particular flow within a computer bus is considered to fall under one of the two flow types: control flow and data flow, and these flows may be differentiated by an addressing scheme. For example, in FIG. 1, when any one of bus interface devices 40a, 40n requires the usage of bus 300, it places a request on bus 300 that indicates a flow type that is associated with the type of operation ready to occur.

The theoretical bandwidth of the bus-oriented computer system 500 as shown in FIG. 1 is limited by the structure of bus 300 itself, and is preferably calculated by the width of bus 300 multiplied by the number of bus cycles per second. The bandwidth of bus-oriented computer system 500 can be increased by segmenting the overall flow into two or more flow types, such as control flow and data flow as mentioned above, and physically distributing these flows over two separate instantiations of the same bus structure. While a single bus interface device cannot simultaneously perform multiple bus operations, multiple bus interface devices can simultaneously perform bus operations as long as the operations consist of different flow types. Hence, for example, if all bus operations were distributed equally between two flow types, the bus extension technique under a preferred embodiment of the present invention would effectively double the bandwidth of computer system 500.

Figure 2:
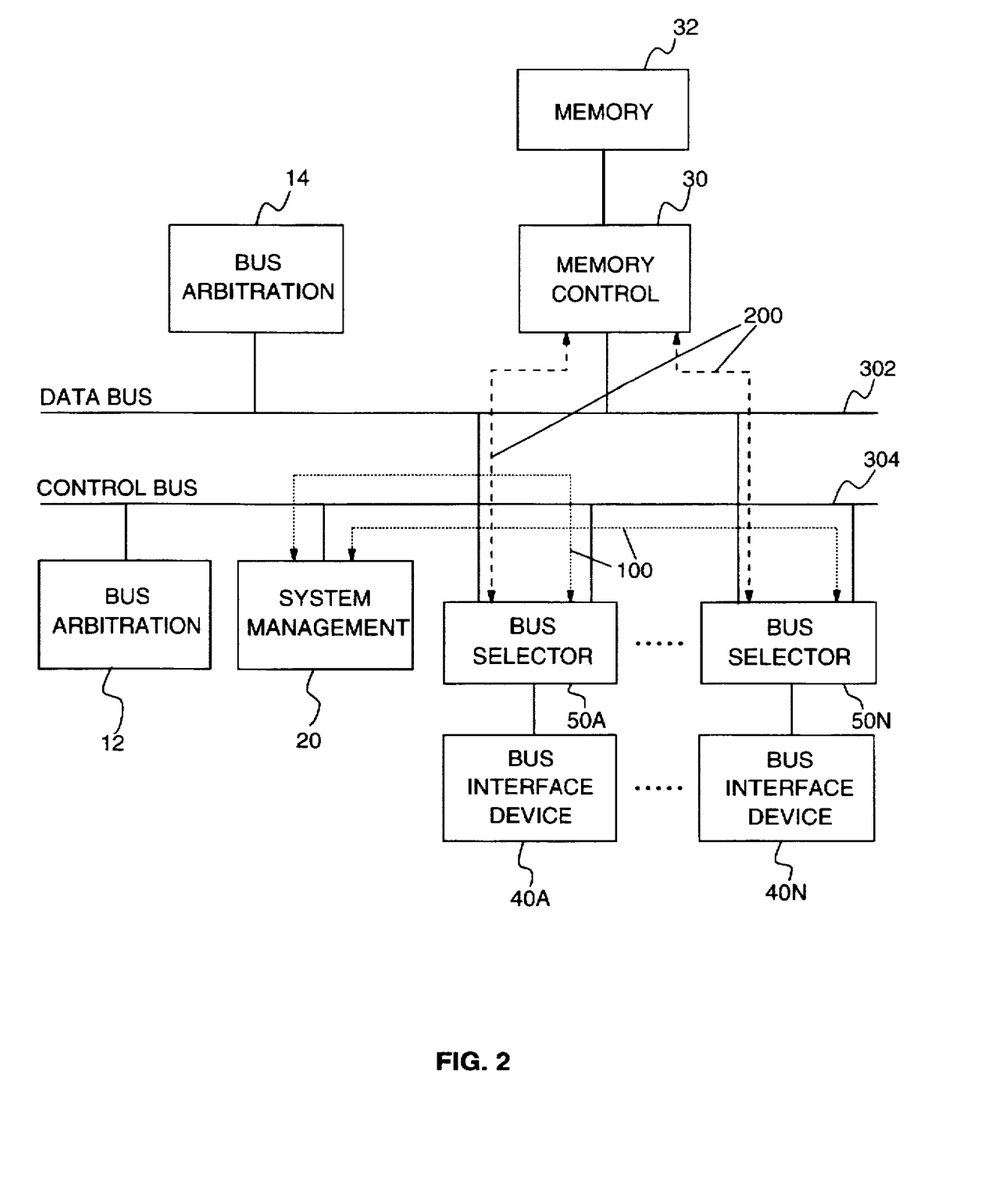
FIG. 2 is a block diagram of a distributed flow bi-segmented bus arrangement according to a preferred embodiment of the present invention.

Referring now to FIG. 2, there is illustrated a block diagram of a distributed flow bi-segmented bus arrangement according to a preferred embodiment of the invention. As shown in FIG. 2, there are one control bus 304 and one data bus 302. All control flow traffic is preferably directed to control bus 304 via control flow 100, and all data flow traffic is preferably directed to data bus 302 via data flow 200. In addition, all system control components participating solely in control flow 100, e.g., system management 20, are connected only to control bus 304. Similarly, all components participating solely in data flow 200, e.g., memory control 30, are connected only to data bus 302. Components that are participating in both types of flows, such as bus interface devices 40a, 40n, are connected to both control bus 304 and data bus 302 via bus selectors 50a, 50n. Each of the two buses also has its own bus arbitration function; for example, bus arbitration 12 is for control bus 304 and bus arbitration 14 is for data bus 302. When one of bus interface devices 40a, 40n needs to access either data bus 302 or control bus 304, bus arbitrations 12, 14 will utilize one of the two buses based on the data flow type, leaving the other bus free for other components.

As mentioned above, one of the objectives of this invention is to improve the performance of an existing bus-oriented computer system without significant design changes to the existing hardware components. By comparing FIG. 1 and FIG. 2, the most obvious component that can be re-utilized without modification is the bus arbitration function. Because bus arbitrations 12 and 14, respectively for each of the two segmented buses in FIG. 2, are identical to bus arbitration 10 of bus 300 in FIG. 1, hence this function may simply be replicated for each of the segmented buses (i.e., control bus 304 and data bus 302) without any additional change. Similarly, those components that only require attachment to a single instance of the segmented buses do not require any design modification because each segmented bus will appear to them as if it were a single bus with which they are designed to work. The remaining components on bus 300 in FIG. 1 are bus interface devices 40a, 40n, which may be served as either bus masters or bus slaves. As a preferred embodiment of the invention, changes are typically not necessary for bus interface devices 40a, 40n though external logic are required to select a specific bus for bus interface devices 40a, 40n based on the data flow type and direct the data flow into that selected bus. Such external logic can be added as an addendum to existing bus interface devices 40a, 40n or be incorporated into some new bus interface devices.

As a preferred embodiment of the invention, the bus signals for control bus 304 and data bus 302 may be further divided into two groups: bus request and bus control. The bus request group is a set of signals that are utilized to gain access to a given bus while the bus control group is a set of signals that are utilized to actually perform a bus cycle.

In order to direct the bus control signals to an appropriate segmented bus of the distributed flow arrangement, each bus interface device requires a set of bi-directional latched transceivers for each bus. For example, in the case of a bi-segmented bus system as shown in FIG. 2, two sets of transceivers are needed for the bus control signals in each bus interface device. In addition, the bus interface device needs to be able to control the enabling of these transceivers such that once the bus interface device has gained access to the appropriate bus, it can enable the set of transceivers for that bus allowing the bus control signals to be valid on that bus, resulting in bus operations being directed to the selected bus.

In addition, latched transceivers are required to allow a bus interface device serving as a bus master to access another bus interface device as a bus slave, even if that bus interface device is currently operating as a bus master on another bus. All bus masters that are also capable of being accessed as bus slaves must monitor the bus or buses on which it is not participating as a bus master to accept accesses as a bus slave. It utilizes the transceivers to latch any bus slave accesses that occur in the event that the bus slave access is destined for it while serving as a bus master on another bus. When the bus interface device completes its bus master operation, it allows the latched bus slave access to pass on to its bus control signals as if it were currently taking place on the bus.

Implementation with an Existing Bus Interface Device

Figure 3:
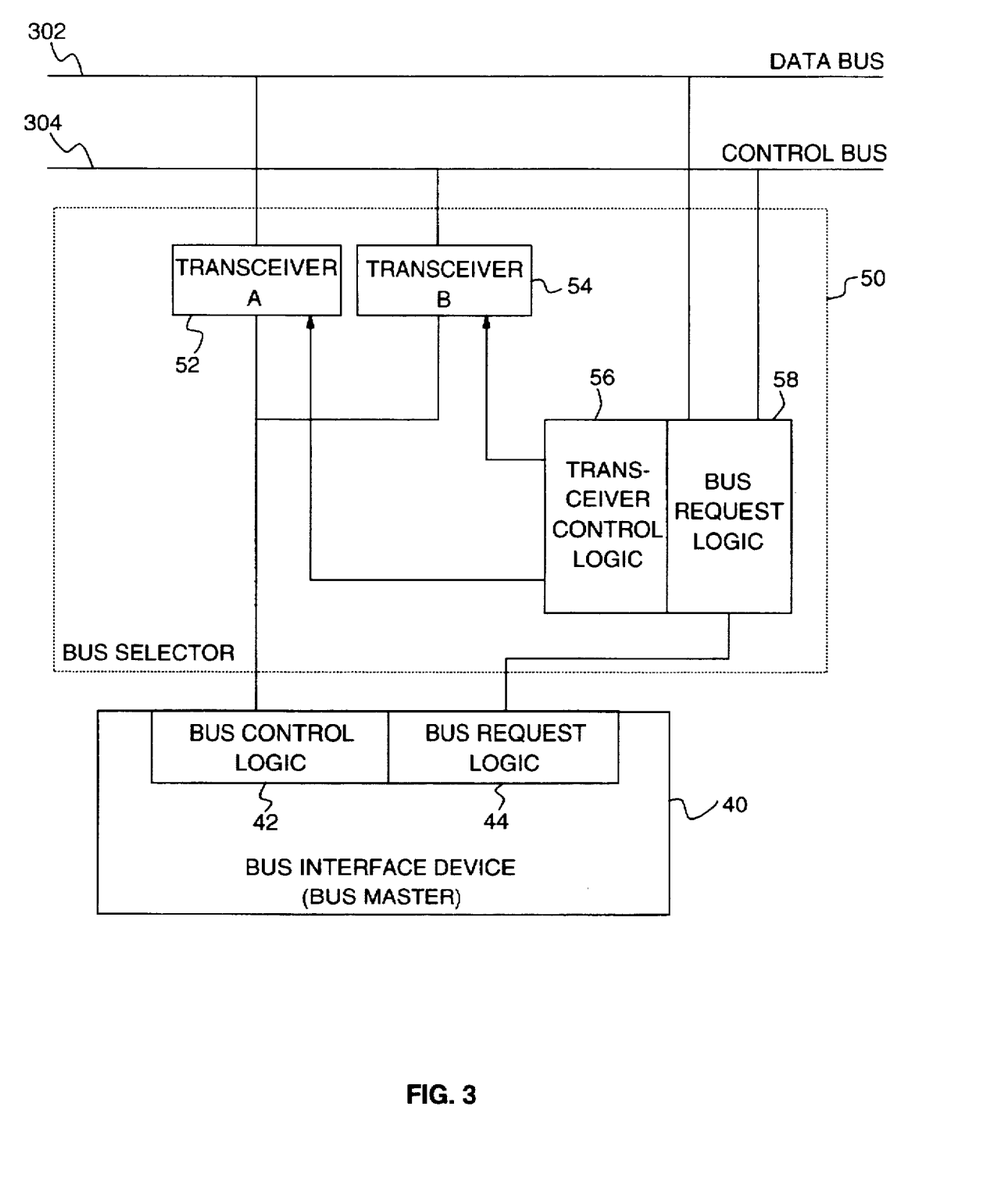
FIG. 3 is a block diagram depicting an existing bus interface design implementation according to a preferred embodiment of the present invention.

Referring now to FIG. 3, there is illustrated a block diagram showing how an existing bus interface device 40 may be attached to a distributed flow bi-segmented bus arrangement of FIG. 2, according to a preferred embodiment of the present invention. Bus interface device 40 is coupled to bus selector 50. Within bus selector 50, there are transceivers 52, 54, transceiver control logic 56 and bus request logic 58. Transceiver 52 and transceiver 54, both receiving inputs from transceiver control logic 56, are connected to data bus 302 and control bus 304 respectively, while bus request logic 58 connects to both data bus 302 and control bus 304. Within bus interface device 40, there are bus control logic 42 connecting to transceivers 52, 54, and bus request logic 44 connecting to bus request logic 58 of bus selector 50.

Under this implementation configuration, additional external logic for bus selection as mentioned above is incorporated within bus selector 50, while there is no change to an existing bus interface device 40. Because bus interface device 40, which is previously designed for a single bus architecture, can only recognize a single bus to which it is attached, the external logic within bus selector 50 must determine which bus bus interface device 40 needs to access based on the mechanism for indicating flow type in the single bus architecture. Then, the external logic within bus selector 50 must also arbitrate for an appropriate bus in the bisegmented bus system.

If the single bus architecture begins by identifying the flow type of the bus operation first, then the invention can take advantage of this fact and utilizes any required external logic to correctly request an appropriate bus. However, in most single bus architectures, bus interface device 40 does not indicate the flow type of the operation prior to arbitrating for a bus. Thus, in these cases, different algorithms may be utilized to arbitrate for the appropriate bus. For the purpose of illustration, only three of these algorithms are described in the following. There are advantages and disadvantages associated with each of these algorithms, and the one that is most suitable for a given application should be selected. In all of the cases described below, bus interface device 40 needs to think that it owns the bus, which allows bus interface device 40 to initiate the bus operation. At this time, transceivers 52, 54 are not enabled, and the control signal values can be attached by the internal latches of transceivers 52, 54. This allows the selection logic within bus selector 50 to decode the operation and determine its flow type prior to its being presented to any bus in the system. Once the correct bus has been requested and granted, the appropriate set of transceivers 52, 54 is enabled, allowing the latched bus operation to continue on the appropriate bus.

a. Wait and See

In the first arbitration algorithm, the selection logic within bus selector 50 waits until bus interface device 40 indicates the flow type of the operation before it arbitrates for an appropriate bus. When the bus arbitration function has granted ownership of the appropriate bus, bus control logic 42 enables either transceiver 52 or 54 and allows the access to continue onto the appropriate bus. The advantage of this algorithm is that no bus is arbitrated for and therefore potentially granted until the bus that is required for the operation is known. The disadvantage of this algorithm is that some additional latency—from the time when bus interface device 40 arbitrates for the bus to the time when bus interface device 40 really has access to the bus—could be introduced when the bus utilization is low.

b. Educated Guess

The second algorithm assumes that, when bus interface device 40 arbitrates for the bus, it will always want a specific bus. The external logic within bus selection 50 begins to arbitrate for this bus on behalf of bus interface device 40. When bus interface device 40 initiates the bus operation and indicates its flow type, the external logic within bus selection 50 can either continue the operation on the originally selected bus or arbitrate for a different bus based on the flow type of the operation. The advantage here is that, if bus interface device 40 tends to do most of its activity on a specific bus, there is no additional delay for bus interface device 40 to get access to that bus. The disadvantage, however, is that if the flow type of the operation is different from that belonging on the bus currently being requested, the external logic within bus selector 50 must stop requesting that bus and start requesting another, resulting in a potential delay for the access.

c. Take and Let Go

The third algorithm involves the requesting of all the buses simultaneously by the selection logic within bus selector 50, when bus interface device 40 is requesting a bus. When the flow type of the operation is identified, the selection logic within bus selector 50 stops requesting the buses that will not be utilized and continues the operation on the appropriate bus. The advantage of this algorithm is that bus interface device 40 has already begun requesting the appropriate bus, and there will be no additional delay regardless of which bus is actually required. The disadvantage is that the external logic within bus selector 50 is requesting ownership of buses that it may or may not need, and this could decrease bus performance if the accesses to these buses are granted and not utilized.

All of the above three algorithms assume that once a bus is owned by bus interface device 40 and operations are being performed, bus interface device 40 will not change the flow type of the operation without relinquishing ownership of the bus. However, in reality, bus interface device 40 may violate this assumption. Therefore, the selection logic within bus selector 50 needs to monitor the activity of bus interface device 40 once it has begun an operation on a particular bus. If the flow type of the operation changes, the selection logic within bus selector 50 must relinquish ownership of the bus currently owned and request ownership of the appropriate bus for a new flow type. The selection logic within bus selector 50 must also redirect the operation to the newly acquired bus.

Implementation with a New Bus Interface Device

Figure 4:
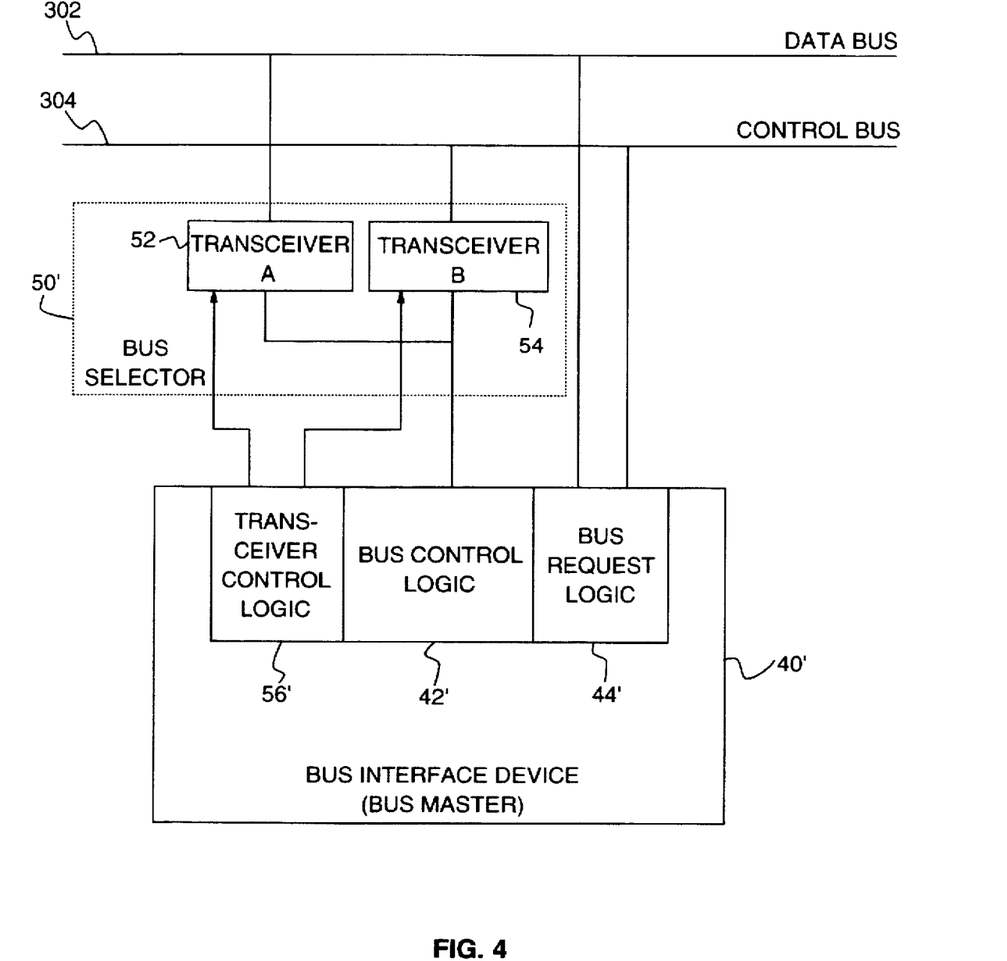
FIG. 4 is a block diagram depicting a new bus interface design implementation according to a preferred embodiment of the present invention.

When the bus interface device of this invention is implemented with a new design of the bus interface device, the changes necessary for attachment to a distributed flow extension, such as transceiver control and bus request logic, can be integrated into the new design, and the requirement for additional external logic can be eliminated. Referring now to FIG. 4, there is illustrated a block diagram of how a new bus interface device 40' may be attached to a segmented and distributed flow bus extension system. Bus interface device 40' is coupled to bus selector 50'. Within bus selector 50', there are only transceivers 52, 54, while within bus interface device 40', there are transceiver control logic 56', bus control logic 42', and bus request logic 44'. Transceiver 52 and transceiver 54, both receiving inputs from transceiver control logic 56' and bus control logic 42', are connected to data bus 302 and control bus 304 respectively. Bus request logic 44' connects separately to data bus 302 and control bus 304.

The most significant advantage of having the external logic integrated into bus interface device 40' is that bus request logic 44' can now easily request the bus required to perform each bus operation. In other words, bus interface device 40' has a prior knowledge of the distributed flow bus and can steer all bus operations accordingly at the time the bus is requested.

With the integration of the external logic into bus interface device 40', the problem of bus selection is also simplified because bus request logic 44' is now capable of knowing the exact bus request to perform each bus operation prior to requesting the bus. Here, bus request logic 44' inside bus interface device 40' simply requests the appropriate bus based on the flow type of the operation that bus request logic 44' needs to perform. When the appropriate bus has been granted, transceiver control logic 56' takes over and directs the control signals onto the appropriate bus.

Furthermore, the problem of bus re-selection during a given ownership is not encountered when using bus interface device 40'. This is due to the fact that bus interface device 40' can now inform bus request logic 44' directly when bus interface device 40' needs to change the bus that bus interface 40' is utilizing, and bus request logic 44' can request the next appropriate bus.

Alternative Embodiment

Figure 5:
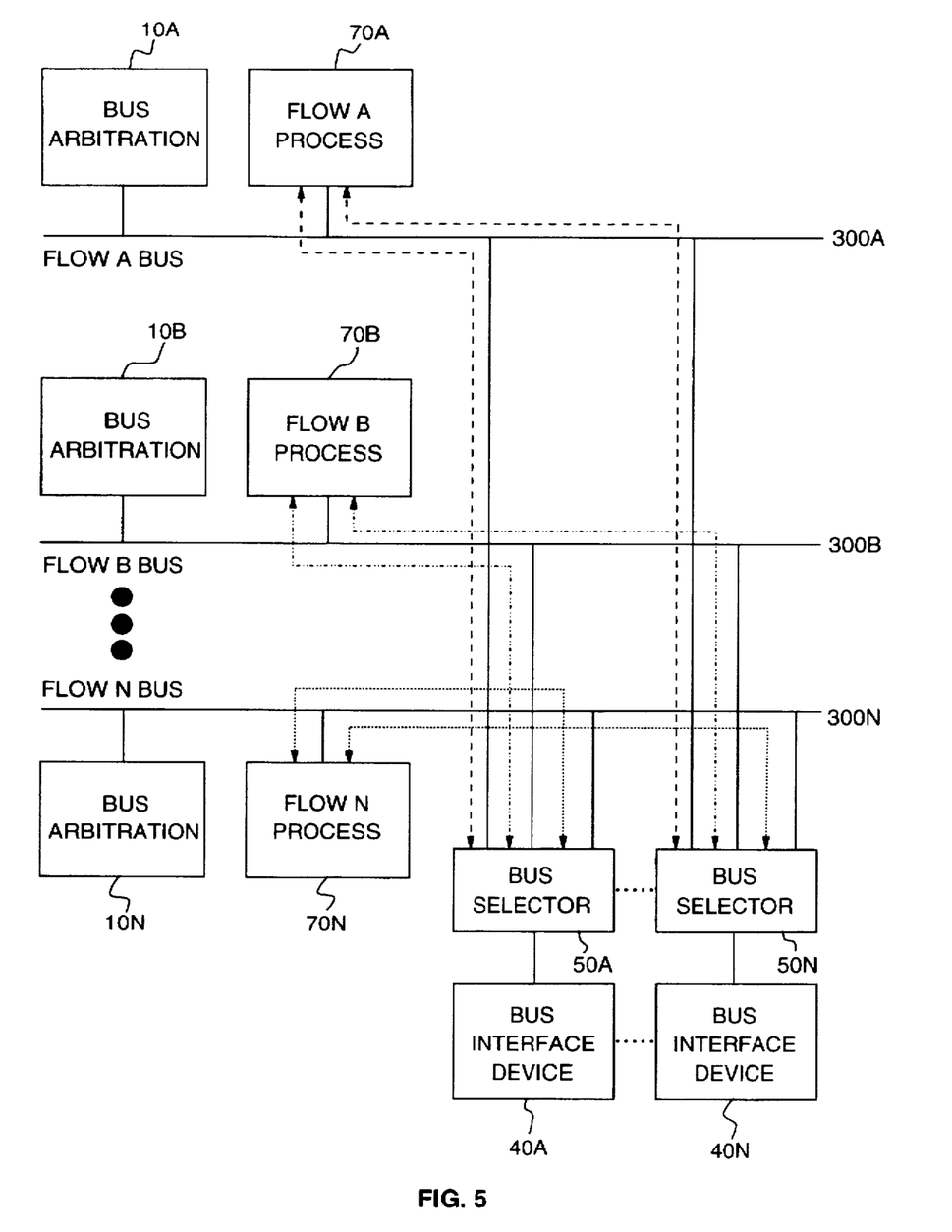
FIG. 5 is a block diagram depicting a distributed multi-segmented flow bus extension.

Referring now to FIG. 5, there is illustrated a block diagram of an alternative embodiment of the invention. Bus arbitration 10a through bus arbitration 10n and flow A process 70a through flow N process 70n are respectively connected to flow A bus 300a through flow N bus 300n. In addition, bus interface devices 40a, 40n coupling to bus selectors 50a, 50n are individually attached to each of flow A bus 300a through flow N bus 300n.

This multi-segmentation of the bus flow, as shown in FIG. 5, allows for greater physical distribution of the bus operations and greater parallelism. The central factor that may limit the ability to provide such a multi-segmented bus flow lies within the mechanism for identifying these flow types in the original bus architecture. The original bus architecture must provide a simple mechanism to uniquely identify each of these flow types in order to perform such segmentation and distribution. Although this multi-segmentation can provide significant performance improvements with minimal development time and expenses, it also comes along with additional costs in replicating some specific bus functions such as arbitration or memory control as well as additional real estate requirements for providing multiple physical buses.

Micro-Channel™ Implementation

Figure 6:
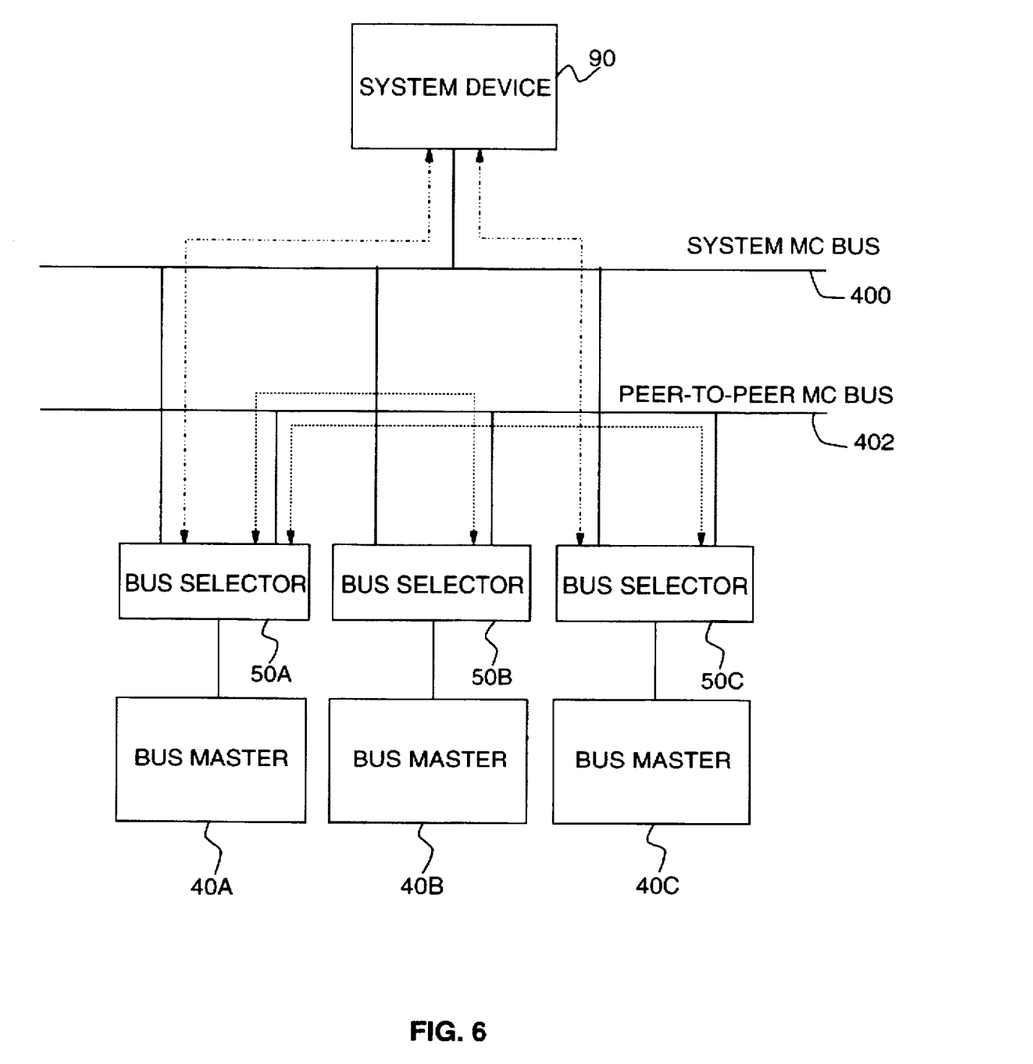
FIG. 6 is a block diagram illustrating an implementation of the present invention on a Micro-Channel™ bus architecture.

Referring now to FIG. 6, there is illustrated a block diagram of an implementation of the present invention on a Micro-Channel™ bus architecture according to a preferred embodiment. Micro-Channel™ bus architecture is originally designed and developed by International Business Machines Corporation. As shown in FIG. 6, the original Micro-Channel™ bus is divided into system MC bus 400 and peer-to-peer bus 402. Bus masters 40a, 40b, 40c are respectively coupled with bus selectors 50a, 50b, 50c, and each of these bus selectors 50a, 50b, 50c is individually connected to both system MC bus 400 and peer-to-peer bus 402. System device 90 is connected to system MC bus 400.

This implementation takes advantage of the alternate ARB (arbitration) level requirements of the Micro-Channel™. The majority of bus masters 40a, 40b, 40c chipsets have a second ARB level to support both types of access. As shown, a segmented and distributed Micro-Channel™ bus system is implemented, allowing system accesses on system MC bus 400 and peer-to-peer accesses on peer-to-peer bus 402 to occur simultaneously. The alternate ARB level signals from bus masters 40a, 40b, 40c for these two types of access can be utilized here to control access to each bus. This is an example of a bus tag being utilized to segment the flows.

The Micro-Channel™ bus ARB level signals are active prior to any other bus cycle signals, and they are driven for the entire cycle. These facts allow the logic within bus selectors 50a, 50b, 50c to be very simple. The bus selection mechanism would basically consist of a comparison of the ARB level signals to decide which bus to request, then these same signals can be utilized to control the bus transceivers, enabling one bus and disabling the other. Because the Micro-Channel™ bus utilizes transceivers in its normal configuration, one set of transceivers already is in existence and more importantly, the control of those transceivers to effect a bus cycle has already been implemented in a bus master device. This allows the logic within bus selectors 50a, 50b, 50c to utilize those same controlling signals for the two sets of transceivers required to distribute the bus flows.

What is even more important to note here is not necessarily that two buses-system MC bus 400 and peer-to-peer MC bus 402—are implemented to increase throughput as the end result, but rather the traffic is split between the two buses in a systematic way that can easily be implemented on a technology that is currently available.

As has been described, the present invention provides a method for solving a common problem in product development of improving system performance in minimal time with minimal development expenses. Specifically, the present invention improves the effective bandwidth of an existing single bus architecture with minimum or no design changes to the existing hardware, bus protocol or bus operation, by creating multiple physical instantiations of the single bus and directing traffic onto each segmented bus based on the type of bus operation being performed. This results in multiple components having the capability to simultaneously perform bus operations, therefore improving the effective bandwidth of the bus. This invention also allows components which are current being utilized in the existing bus architecture to be utilized with minimum additional external logic.

The greatest advantage of this bus extension technique is that it takes advantage of a bus architecture that already exists and extends it to provide greater overall bandwidth. Therefore, less time is needed to develop a new architecture. The actual bus protocol is the same on each of the segmented buses as it is on the original single bus architecture. As a result, any device that is designed to be utilized in the original bus architecture will also be compatible with the buses utilized in the extended architecture. Therefore, many of the previously designed single bus entities can be utilized in this bus extension technique with no modifications.

While the invention has been particularly shown and described with reference to a preferred embodiment, it will be understood by those skilled in the art that various changes in form and detail may be made therein without departing from the spirit and scope of the invention.

What is claimed is:

1. A method for improving the effective bandwidth of a computer system having a predetermined group of components connected to a single bus, without altering said predetermined group of components, said method comprising the steps of:

providing a second bus that is identical to said single bus;
separating all of said predetermined group of components into at least two groups according to a respective flow type;

connecting a first group of said predetermined group of components to said single bus; and connecting a second group of said predetermined group of components to said second bus, wherein said second group of said predetermined group of components provides different functionalities from said first group of said predetermined group of components, wherein data flow associated with said first and second group of said predetermined group of components stay in a respective bus and do not crossover, wherein each group of said predetermined group of components act as if each component is still connected to said single bus such that effective bandwidth of said computer system is improved.

2. The method for improving the effective bandwidth of a computer system of claim 1, wherein said method further comprises connecting a third group of said predetermined group of components to said single bus and said second bus via an external logic means.

3. A method for improving the effective bandwidth of a computer system having a predetermined group of components connected to a single bus, without altering said predetermined group of components, said method comprising the steps of:

providing a second bus that is identical to said single bus;

separating said predetermined group of components into three groups, each according to a flow type utilized by said components in said single bus;

connecting a first group of said predetermined group of components to said single bus;

connecting a second group of said predetermined group of components to said second bus, wherein said second group of said predetermined group of components provides different functionalities from said first group of said predetermined group of components; and connecting a third group of said predetermined group of components to both said single bus and said second bus via some external logic means having at least two transceivers, wherein each group of said predetermined group of components act as if each component is still connected to said single bus such that effective bandwidth of said computer system is improved.

4. The method for improving the effective bandwidth of a computer system according to claim 3, wherein said single bus is for control flow and said second bus is for data flow.

5. A method for improving the effective bandwidth of a computer system having a predetermined group of components connected to a single bus, without altering said predetermined group of components, said method comprising the steps of:

providing a plurality of buses that are identical to said single bus;

separating all of said predetermined group of components into a plurality of groups according to a respective flow type, wherein each group of said predetermined group of components provides different functionalities; and connecting each group of said predetermined group of components to said single bus or one of said plurality of buses, wherein data flow associated with each group of said predetermined group of components stay in a respective bus and do not crossover, wherein each group of said predetermined group of components act as if each component is still connected to said single bus such that effective bandwidth of said computer system is improved.

6. The method for improving the effective bandwidth of a computer system of claim 5, wherein said connecting step further comprises connecting one of said group of said predetermined group of components to said single bus and all of said plurality of buses via some external logic means.

7. A system for improving the effective bandwidth of a computer having a predetermined group of components connected to a single bus, without altering said predetermined group of components, said system comprising:

means for providing a second bus that is identical to said single bus;

means for separating all of said predetermined group of components into at least two groups according to a respective flow type;

means for connecting a first group of said predetermined group of components to said single bus; and means for connecting a second group of said predetermined group of components to said second bus, wherein said second group of said predetermined group of components provides different functionalities from said first group of said predetermined group of components, wherein data flow associated with said first and second group of said predetermined group of components stay in a respective bus and do not crossover, wherein each group of said predetermined group of components act as if each component is still connected to said single bus such that effective bandwidth of said computer system is improved.

8. The computer system having the improved effective bandwidth according to claim 7, wherein said computer system further includes a third group of said predetermined group of components connected to said single bus and said second bus via an external logic means.

* * * * *